Figure 1:
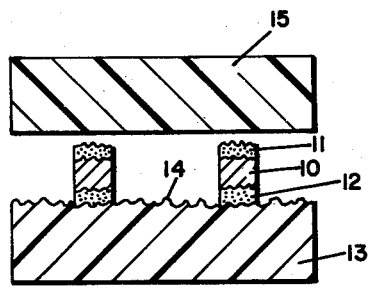

Victor F. Dahlgren
INVENTOR
Robert O. Richardson
ATTORNEY 3,186,887
ENCAPSULATED ARTICLE AND METHOD
OF MAKING
Victor F. Dahlgren, Woodland Hills, Calif., assignor to Sanders Associates, Inc., Nashua, N.H., a corporation of Delaware
Filed Dec. 27, 1960, Ser. No. 78,634
1 Claim. (Cl. 156—298)

This invention relates to an encapsulated article and method of making, and more particularly, it relates to printed circuits covered with an insulating material. This application is a continuation in part of my co-pending applications, Serial No. 21,273, filed April 11, 1960, and Serial No. 598,170, filed July 16, 1956, now abandoned.

In the prior art, printed circuits were typically formed by bonding thin copper sheets with a suitable adhesive to an insulated base formed from a thermosetting resin. Selected portions of the copper were etched away, leaving a conductive pattern in the configuration of the desired circuit. However, thermosetting resins are characteristically hygroscopic, and under high humidity conditions, insulation resistance between the conductors was reduced. This material has been replaced in many uses with trifluorochloroethylene, termed herein Kel-F as a trademark and manufactured by the Minnesota Mining and Manufacturing Company. This is superior to thermosetting resin material in that it has a low permeability to humidity as well as an enhanced insulation resistance. Another suitable material, tetrafluorochloroethylene, termed herein Teflon as a trademark and manufactured by the Du Pont Company, and other types of thermoplastic material may be used in the practice of this present invention. In my co-pending application, Serial No. 21,273, there is disclosed a method of bonding thin copper sheets to a base of thermosetting material or more broadly, a plastic resin having a flow characteristic at a given temperature. This is done by providing a coating of black cupric oxide to the copper sheet and laminating the plastic and copper together by means of sufficient heat and pressure to form thereby an imprint of the cupric oxide in the plastic. When the laminated copper plastic has been cooled and the copper removed, there is exposed a plurality of randomly exposed follicles in the plastic provided by the imprint. In that co-pending application a surface of a second plastic resin having a greater tendency to flow at a temperature substantially less than the given temperature was placed in contact with the imprinted surface. The plastic resins were pressed together at a temperature substantially less than the given temperature to force the second plastic resin into the follicles to provide a bond therebetween.

In accordance with the present invention, there is provided a method of bonding a thermoplastic resin of a given flow characteristic with a similar thermoplastic resin of the same flow characteristics. It has been found in the practice of sandwiching copper sheets between insulating sheets of thermoplastic material initially having the same flow characteristics, that when the base plastic sheet is laminated to the cupric oxide coated copper sheet and then portions of the copper are removed, that this base sheet requires a higher temperature to cause it to flow than before such treatment, and that by placing another sheet of the same plastic material not subjected to this treatment as a cover coat, the cover coat will then flow first at the original temperature. In this manner the base sheet does not flow at the initial laminating temperature and retains the copper configuration thereon such that portions of the configuration do not move around relative to other portions when the top cover coat is applied. This method of laminating permits very close spacing of conductive strips without making contact and is especially useful in the flexible printed circuit art. To encapsulate copper between two sheets of thermoplastic material such that the material is of the same thickness above and below the copper it therefore requires that the top sheet be slightly thicker than the base sheet, since the top coat must flow around the copper on the base sheet to intrude into the follicles of the base sheet. This flowing around and between the copper strips further serves to maintain the initial spacing therebetween.

It has been found also in the application of the top sheet of thermoplastic material that if the base sheet and copper bonded thereto is first subjected to heat and pressure the copper will penetrate the follicled surface. This again provides for a plastic material to maintain the spacing between the copper strips. The copper may be embedded completely flush or below the surface as disclosed in my co-pending application, Serial No. 598,170, filed July 16, 1956, or it may be depressed only partially and the top coat during its lamination will flow down around and between the exposed copper. In this case the determination as to the thickness of the cover coat will depend upon the penetration of the copper strips into the base material.

Figure 2:
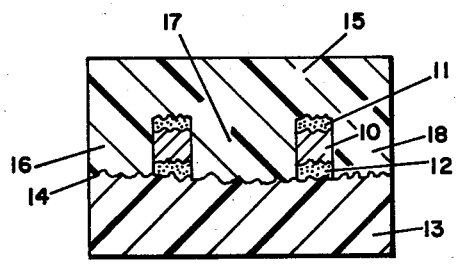
Figure 3:
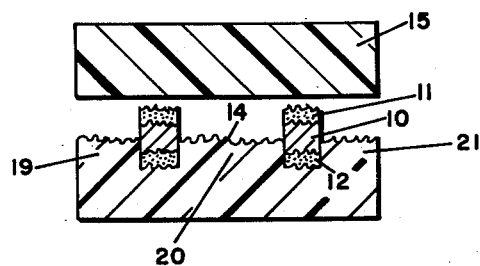

In the accompanying drawing:

FIGURE 1 shows in cross section the base material with copper oxide coated copper strips bonded to the follicled surface and with the top thermoplastic material in position prior to its lamination, FIGURE 2 is a sectional view of the completed article showing how the cover coat flows around and between the copper strips and into the follicles on the top surface of the base material, and FIGURE 3 shows a modification wherein the copper strips are partially embedded in the base material.

Referring now to FIGURE 1, a sheet of copper is coated with cupric oxide 11 and 12 and then bonded to a base 13 under suitable heat and pressure. The cupric oxide has the characteristic that it will not flake off but will effect a good bond. A desired configuration is then masked out on the top surface of the copper and the exposed portion removed such as by chemical etching for example. The exposed surfaces from which the copper has been removed from the plastic material will have follicles which had been formed by an imprint of a cupric oxide when the copper was bonded to the plastic. A sheet of thermoplastic material 15 having the same flow characteristics is shown placed over the conductors for lamination. Suitable examples of temperatures, pressures and procedures are disclosed in my co-pending applications.

In FIGURE 2 there is shown in cross section the results of the lamination under suitable heat and pressure wherein the top sheet reached its flow point and flowed down between and around the copper conductors to become imbedded in the follicles of the lower sheet. In the finished product the irregular surface is still visible to the naked eye when light is reflected at an angle, showing that the bottom sheet had not reached its flow point at the same temperature as the top sheet. If a still higher laminating temperature is desired, portions 16, 17 and 18 of the top sheet 15 help to retain strips 10 in position. The particular reason or cause for this phenomena is not known although it is believed that perhaps the previously treated sheet has in some manner changed its flow characteristics to a higher temperature or that the follicles present a greater exposed surface for cooling, thus requiring a greater temperature to make a lower sheet flow. As shown in FIGURE 2 the thickness of sheet 15 above the copper conductor will be less than the thickness of the material 13 below the conductors if initially the two thicknesses were the same. This must be compensated for by using a sheet 15 of somewhat greater thickness if it is desired to center the conductors midway within the encapsulation.

In some instances there is a relationship between the plastic thickness and the copper thickness such that any movement of the plastic will tend to force the conductors away from their original position during the cover coating operation. This excursion is controlled by impressing the uncover coated circuitry into the base plastic sheet as was mentioned in my copending application, Serial No. 598,170. By imbedding the conductors downwardly into the base platsic there is a tendency to lock them into position and their movement is thus controlled. The resistance of this plastic along the sides of the conductors such that they will not move from the original desired position is shown in FIGURE 3 where the conductors 10 are imbedded approximately midway into the base sheet 13, leaving portions 19, 20 and 21 of the plastic material along the sides to oppose any lateral movement. In some cases this may be accomplished by pressure alone and in other cases heat and pressure is required so as to materially soften the plastic material and then permit it to solidify before applying the top coat 15. In FIGURE 3 where the conductors are only partially imbedded, the top coat will flow around and between the conductors as shown in FIGURE 2 when laminated. However, if the conductors are imbedded flush with the top surface of the base material the lamination of fusion at the interface may be accomplished by using only sufficient pressure and temperature to make the lamination less than that required to cause the cover coat to flow down between the conductors.

While there have been hereinbefore described what are at present preferred embodiments of the invention, it will be apparent that many and various changes and modifications may be made to the embodiments illustrated without departing from the spirit of the invention. It will be understood, therefore, that all such changes and modifications as fall fairly within the scope of the present invention as defined in the appended claim are to be considered as a part of the present invention.

What is claimed is:

The method of bonding thermoplastic resins comprising the steps of oxidizing a surface of a body of copper to provide a coating primarily of black cupric oxide, placing said cupric oxide coated copper surface in contact with the surface of a first thermoplastic resin having a flow characteristic at a given temperature, applying a sufficient degree of heat and pressure to laminate said plastic resin and the copper together, forming thereby an imprint of said cupric oxide in said plastic resin, removing portions of said cupric oxide coated copper from said plastic resin to define a copper configuration and a plurality of exposed follicles provided by said imprint in the exposed plastic, forcefully depressing said copper configuration into the follicled surface until said copper configuration is partially driven into said surface of said first coat to thereby lock said configuration in place to prevent conductor displacement during a subsequent laminating step, placing a surface of a second sheet of thermoplastic resin having a tendency to flow at said given temperature in contact therewith and over said partially driven copper configuration, and heating and pressing said plastic resins together to force said second plastic resin into said follicles to provide said bond therebetween and form a laminate.

References Cited by the Examiner
UNITED STATES PATENTS 2,711,983  6/55  Hoyt.
2,932,599  4/60  Dahlgren.
2,964,436  12/60  Mikulis et al.

EARL M. BERGERT, *Primary Examiner.*

CARL F. KRAFFT, *Examiner.*